Figure 1:
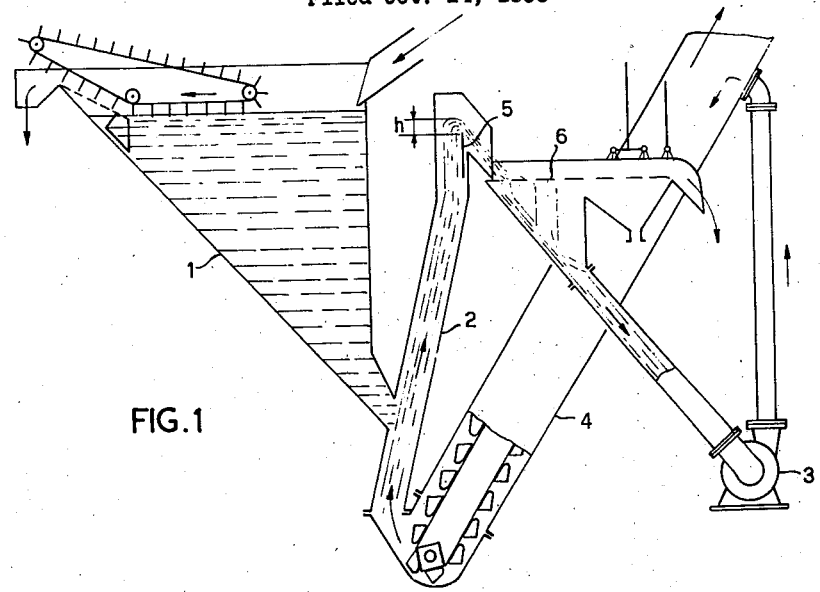

May 6, 1958 M. BOSMAN ET AL 2,833,411
SEPARATING APPARATUS WITH CONSTANT FLOW RATE CONTROL
Filed Oct. 14, 1953

Inventors
Michiel Bosman
Josef M. H. Beckers
By Cushman, Darby & Cushman
Attorneys

United States Patent Office 2,833,411
Patented May 6, 1958

2,833,411

SEPARATING APPARATUS WITH CONSTANT FLOW RATE CONTROL

Michiel Bosman, Beek, and Jozef M. H. Beckers, Heerlen, Netherlands, assignors to Stamicarbon N. V., Heerlen, Netherlands Application October 14, 1953, Serial No. 386,016

Claims priority, application Germany October 14, 1952

4 Claims. (Cl. 209—158)

The present invention relates to upward current separating apparatus for separating mixtures of particles into fractions according to specific gravity and/or particle size.

When separating particles with the help of an upward liquid current, those particles the settling rate of which in a static body of the liquid medium employed is higher than the rate of the upward current will gravitate, whereas those particles the settling rate of which in a static body of the medium is lower than the rate of the upward current will be carried upwards by the liquid flow.

When treating a mixture of particles which are all of the same size but which differ in specific gravity, the separation will be effected according to specific gravity. If all the particles have the same specific gravity but differ in size, the separation will be effected according to size. In the practical application of this method, e. g., when separating middlings and refuse in a coal washery, the particles to be separated usually differ both in size and specific gravity. On account hereof, one does not obtain a separation according to specific gravity or particle size but a separation according to settling rate. When a separation which is as far as possible according to specific gravity is desired, however, the settling rate separation effected in the upward current separating apparatus may be much better in practice than the separation that can be produced in a jig-washer if the separation is not effected with water as the separating medium, but with a separating suspension of a higher specific gravity. Moreover, by preliminarily dividing the initial mixture into two or more fractions according to particle size and separately subjecting these fractions to the separation process, the sharpness of separation can be further improved.

When operating with upward current separating apparatus as customarily employed, however, fluctuations in the composition of the material supplied to the separating device or in the rate of its supply, affecting as they do the flow resistance in the upward current separating tube (hereinafter termed "the riser") of the upward current separating apparatus and also the specific gravity of the mixture of liquid and solid particles carried upwards, result in changes in the rate of flow of the rising liquid (the upward current) and consequently in fluctuations in the settling rate according to which the separation is effected.

The present invention aims to provide means whereby the upward current may be kept substantially constant at a value corresponding to the settling rate according to which separation is to be effected, notwithstanding fluctuations in the composition of the feed or in the loading of the apparatus.

According to the present invention there is provided upward current separating apparatus for separating mixtures of particles into fractions according to specific gravity and/or grain size, having an overflow weir to which is connected a dip pipe of a pneumatic weir control system, through which pipe air is adapted, when the apparatus is in use to be passed into the liquid separating medium so that the pressure in the pipe air line changes with change in the height of the overflow, the said system incorporating a diaphragm control with a pressure chamber with which the said air line communicates, and being adapted to operate so that any change in pressure as aforesaid results in automatic movement of the weir and the connected dip pipe so that the desired height of the overflow is maintained.

The static pressure fluctuations in the dip pipe line, which are relatively small, can be amplified, e. g., by arranging for the diaphragm movements in the diaphragm control to control the flow of air under pressure to the pressure chamber of a second diaphragm control the diaphragm of which is operatively coupled to the overflow weir.

The invention will be further explained with reference to the accompanying diagrammatic drawings which illustrate by way of example, one form of apparatus according to the invention.

Figure 2:
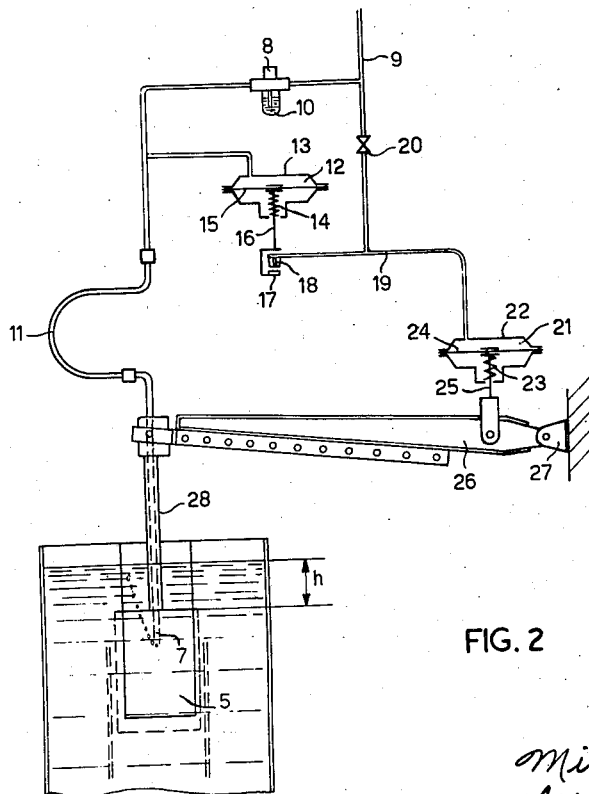

In the drawings, Fig. 1 is an elevation of apparatus for separating coal into three products, Fig. 2, showing a control for keeping the flow rate in the riser at a substantially constant value.

The sediments (middlings and refuse) which gravitate in the heavy liquid separating medium in the separating vessel 1 pass into the upward current in the riser 2. By means of a pump 3 an upward liquid flow is produced in said riser. The flow rate of said upward current is higher than the settling rate in a static body of the same medium of the middlings so that the middlings are carried upwards by the liquid. The refuse, having a higher settling rate in a static body of the medium than the rate of the upward current, gravitate against the said current and are removed by means of a bucket elevator 4. The rising liquid leaves the riser together with the entrained middlings via an adjustable overflow weir 5 and passes onto a screen 6. Subsequently, the liquid passes to the pump 3 which re-introduces it into the system. The liquid consequently circulates from the overflow weir 5 through the screen 6 to the pump 3 and thence through the casing of the bucket elevator 4 and the riser 2. In order to maintain the flow rate at a value which is in conformity with the adjusted settling rate according to which separation is desired, it is necessary for the height $h$ of the overflow, i. e., the vertical distance between the top of the liquid and the top of the overflow weir, to remain constant. If the liquid level should commence to fall, as it may for example, due to a greater rate of supply of middlings to the riser, the edge of the overflow weir 5 must be lowered automatically in order that the original height ($h$) of overflow, and hence the desired upward current rate will be maintained. To this end a dip pipe 7 (Fig. 2) is secured to the overflow weir 5 so as to rise and fall therewith. The dip pipe connects with a compressed air line 9 via a throttle valve 8. By means of this throttle valve the pressure in the dip pipe is so adjusted that the air just bubbles out of the dip pipe. This bubbling can be observed and inspected in the liquid-filled glass bell 10 of the reducing valve 8. The static pressure of the compressed air in the dip pipe line is consequently equal to the static pressure of the liquid head in the riser above the dip pipe outlet and since the dip pipe rises and falls with the overflow weir, it follows that the static pressure in the line to the dip tube 7 is also a measure of the overflow height $h$, independently of the actual height of the liquid level in the riser 2.

The tube 7 is connected with the pressure chamber 12 of a diaphragm control 13 by means of a flexible tubing 11. A rod 16 is firmly secured at one end to the diaphragm 15 which is loaded by the spring 14, and at its other end the rod 16 is connected to a baffle member 17 which moves, in accordance with movements of diaphragm 15, at a very short distance in front of a nozzle 18 provided on a pipe 19. Pipe 19 is connected to the compressed air line 9 via a throttle valve 20 so that, by properly adjusting this throttle valve, the pressure in the pipe 19 can be maintained at a given low value. If, however, the nozzle 18 is shut off by the baffle member 17, the pressure in pipe 19 increases up to the pressure prevailing in the compressed air line 9. Within this range, the pressure in the pipe 19 may be adjusted to any value by the movements of baffle member 17 towards or away from the nozzle 18, since the position of the baffle member in relation to the nozzle determines the degree to which the free emission of compressed air from the nozzle is impeded. The pressure variations which, in dependence on the very small static pressure variations in the line to the dip pipe 7, can thus be produced in the pipe 19 are so great that they can be directly utilised for adjusting the position of the overflow weir as will now be described.

The pipe 19 is connected with the pressure chamber 21 of a diaphragm casing 22 within which there is arranged a diaphragm 24 loaded by the spring 23. The diaphragm 24 is connected to one end of a rod 25 the other end of which is pivotally connected to a lever 26. Lever 26 is at one end hinged to a bracket 27 and its other end is attached to the overflow weir 5 by means of a rod 28.

If, in consequence of an increase in the supply of middlings, the level of the liquid in the riser 2 should commence to fall, the pressure in the dip tube 7 will drop too as a result of which the diaphragm 15 will rise under the pressure of spring 14 and the baffle member 17 will move towards the nozzle 18 causing a pressure rise in the pipe 19 and a downward deflection of the diaphragm 24. The lever 26 connected to this diaphragm will consequently press the overflow weir 5 down until the original overflow height $h$ is restored although the level of the overflow, i. e., the level of the medium in the riser, is lower.

Should the supply of middlings now decrease the level of the liquid in the riser will rise again. At the same time the static pressure in the dip pipe line will rise too, so that the diaphragm 15 will be deflected downwards against the action of the springs 14, thus causing the baffle member 17 to move away from the outlet of the nozzle 18. Consequently, the pressure in the tube 19 will decrease so that the diaphragm 24 will be pressed upwards by the action of spring 23 and the overflow weir 5 will be raised by the lever 26 until the pressure in the dip pipe line corresponds with the desired predetermined value corresponding with the desired overflow height $h$, so that this height is maintained notwithstanding the change in level of the liquid medium in the riser.

The control illustrated is very reliable and of a simple construction. During the operation, the upward current rate to be automatically maintained, which rate determines the settling rate according to which separation takes place, may be changed by altering the pressure of the spring 14.

We claim:

1. An upward current separator comprising a riser, means for introducing material to be separated into said riser at the lower end portion thereof, means for feeding liquid at the lower end of the riser, means for discharging settled particles at said lower end, an adjustable overflow weir at the upper end of the riser for discharging liquid and floating particles, a screen for separating liquid from said floating particles, means for reintroducing said liquid at the lower end of the riser, a dip pipe connected to said overflow weir, means for admitting compressed air to said dip pipe, a diaphragm control device having a pressure chamber communicating with said dip pipe, and means for raising or lowering the overflow weir when the pressure in the dip pipe rises or falls.

2. Apparatus according to claim 1, wherein the pressure fluctuations in the dip pipe line are amplified by arranging the diaphragm movements in the said diaphragm control device to control the flow of air under pressure to the pressure chamber of a second diaphragm control the diaphragm of which is operatively coupled to the overflow weir.

3. Apparatus according to claim 2, wherein the diaphragm of the first said diaphragm control is connected with a baffle member disposed opposite an outlet for air from the air line to the pressure chamber of the second said diaphragm control so that the escape of air through the said outlet is prevented or impeded to a greater or lesser extent according to the position of the said baffle member and hence of the diaphragm of the first diaphragm control.

4. Apparatus according to claim 2, wherein the diaphragm of the second diaphragm control is linked by means of a rod to a lever which at one end is pivoted to a fixed support and at its other end is operatively connected with the overflow weir.

References Cited in the file of this patent

UNITED STATES PATENTS

| 1,851,422 | Durando | Mar. 29, 1932 |
| 2,345,513 | Trostler et al. | Mar. 28, 1944 |
| 2,382,853 | Brammer et al. | Aug. 14, 1945 |
| 2,409,768 | Lavett et al. | Oct. 22, 1946 |
| 2,474,774 | Bean | June 28, 1949 |
| 2,633,863 | Kelly | Apr. 7, 1953 |
| 2,646,169 | Fox et al. | July 21, 1953 |

FOREIGN PATENTS

| 387,882 | France | July 25, 1908 |
| 543,605 | France | Sept. 6, 1922 |